United States Patent
Koo et al.

(10) Patent No.: US 12,079,642 B2
(45) Date of Patent: Sep. 3, 2024

(54) METHOD AND APPARATUS FOR DYNAMICALLY REDUCING APPLICATION RENDER-TO-ON SCREEN TIME IN A DESKTOP ENVIRONMENT

(71) Applicant: ATI TECHNOLOGIES ULC, Markham (CA)

(72) Inventors: Anthony W L Koo, Toronto (CA); Syed Athar Hussain, Toronto (CA)

(73) Assignee: ATI TECHNOLOGIES ULC, Markham (CA)

( * ) Notice: Subject to any disclaimer, the term of this patent is extended or adjusted under 35 U.S.C. 154(b) by 293 days.

(21) Appl. No.: 15/338,492

(22) Filed: Oct. 31, 2016

(65) Prior Publication Data

US 2018/0121213 A1    May 3, 2018

(51) Int. Cl.
| | |
|---|---|
| *G06F 9/44* | (2018.01) |
| *G06F 9/4401* | (2018.01) |
| *G06F 9/451* | (2018.01) |
| *G09G 5/14* | (2006.01) |
| *G09G 5/36* | (2006.01) |
| *G09G 5/399* | (2006.01) |

(52) U.S. Cl.
CPC ............ *G06F 9/451* (2018.02); *G06F 9/4411* (2013.01); *G09G 5/14* (2013.01); *G09G 5/363* (2013.01); *G09G 5/399* (2013.01); *G09G 2310/061* (2013.01); *G09G 2310/08* (2013.01); *G09G 2340/0435* (2013.01); *G09G 2340/14* (2013.01); *G09G 2360/08* (2013.01); *G09G 2360/18* (2013.01)

(58) Field of Classification Search
None
See application file for complete search history.

(56) References Cited

U.S. PATENT DOCUMENTS

| | | | |
|---|---|---|---|
| 7,397,478 B2 | 7/2008 | Jiang | |
| 7,439,981 B2 | 10/2008 | Wilt et al. | |
| 8,189,678 B2 | 5/2012 | Valmiki et al. | |
| 8,334,857 B1 * | 12/2012 | Ogrinc | G09G 5/377 |
| | | | 345/204 |

(Continued)

FOREIGN PATENT DOCUMENTS

| | | |
|---|---|---|
| CA | 2849158 | 3/2013 |
| EP | 1365385 | 11/2003 |

(Continued)

OTHER PUBLICATIONS

[H]ardForum; *How Vsync works, and why people loathe it*; https://hardforum.com/threads/how-vsync-works-and-why-people-loathe-it.928593/; Jul. 18, 2005; pp. 1-15.

(Continued)

*Primary Examiner* — Frank S Chen

(57) ABSTRACT

A system is provided that includes a computing device operable to render video content for display on a display device and to periodically refresh that display device. The video content includes at least one application window. A desktop compositor is operable to wake and execute commands to compose video frames that are composited surfaces that include the at least one application window and to initiate a buffer flip to deliver the video frames to the display device. A high resolution timer is operable to cause the desktop compositor to wake and execute the commands in multiple instances between display refreshes.

24 Claims, 12 Drawing Sheets

(56) References Cited

U.S. PATENT DOCUMENTS

| | | | | |
|---|---|---|---|---|
| 8,547,480 | B1* | 10/2013 | Brown | H04N 21/4307 348/500 |
| 8,605,103 | B2 | 12/2013 | Dumbeck et al. | |
| 9,251,552 | B2 | 2/2016 | Kwa et al. | |
| 2002/0030694 | A1 | 3/2002 | Ebihara et al. | |
| 2003/0107604 | A1* | 6/2003 | Ording | G06F 3/0481 715/788 |
| 2004/0218100 | A1* | 11/2004 | Staker | H04N 5/272 348/592 |
| 2005/0083339 | A1 | 4/2005 | Wilt et al. | |
| 2005/0088447 | A1* | 4/2005 | Hanggie | G06F 3/0481 345/545 |
| 2009/0079763 | A1 | 3/2009 | Takeichi | |
| 2012/0060161 | A1* | 3/2012 | Joung | G06F 9/5038 718/102 |
| 2013/0155101 | A1* | 6/2013 | Louie | G09G 5/14 345/629 |
| 2014/0168241 | A1* | 6/2014 | Jeganathan | G06T 1/20 345/522 |
| 2015/0241951 | A1* | 8/2015 | Noro | G06F 1/3265 345/520 |
| 2016/0066000 | A1* | 3/2016 | Cunningham | H04N 21/44004 725/116 |
| 2016/0247484 | A1 | 8/2016 | Chen et al. | |
| 2017/0053620 | A1* | 2/2017 | Law | G09G 5/363 |
| 2017/0352172 | A1* | 12/2017 | Lim | G06F 3/14 |

FOREIGN PATENT DOCUMENTS

| | | |
|---|---|---|
| EP | 1959425 | 8/2008 |
| EP | 2629182 | 8/2013 |
| JP | 2002182639 A | 6/2002 |
| JP | 2009075888 A | 4/2009 |
| JP | 2011154091 A | 8/2011 |
| KR | 20160019896 A | 2/2016 |
| WO | 2014200534 A1 | 12/2014 |

OTHER PUBLICATIONS

Derek Wilson; AnandTech; *Exploring Input Lag Inside and Out*; http://ww.anandtech.com/show/2803/5; Jul. 16, 2009; pp. 1-5.

PCT/CA2017/051206 ISR & WO dated Jan. 11, 2018.

Lai et al; *Real-Time 3D Rendering Processor for 2D-to-3D Conversion of Stereoscopic Displays*; 2014 IEEE International Conference on Consumer Electronics; 2014; pp. 117-118.

Piccarreta et al.; *An Efficient Video Rendering System for Real-Time Adaptive Playout Based on Physical Motion Field Estimation*; 2005 13th European Signal Processing Conference; 2005; pp. 1-4.

Shuai et al.; *Low-Latency Dynamic Adaptive Video Streaming*; 2014 IEEE International Symposium on Broadband Multimedia Systems and Broadcasting; 2014; pp. 1-6.

EP Patent Application No. 17863900.1 Supplementary European Search Report dated May 25, 2020.

* cited by examiner

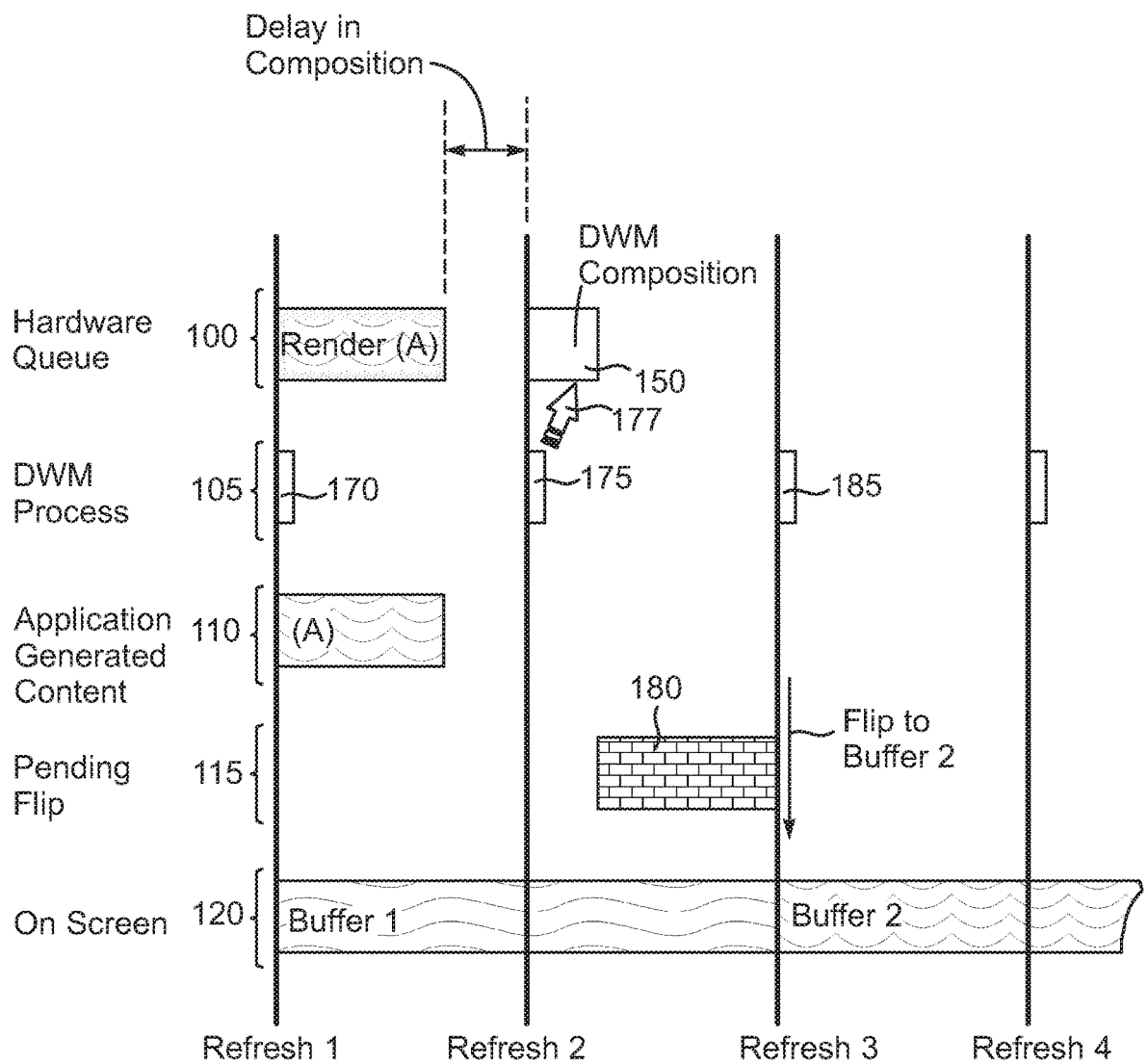
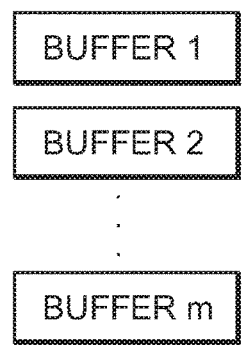
FIG. 5
(PRIOR ART)

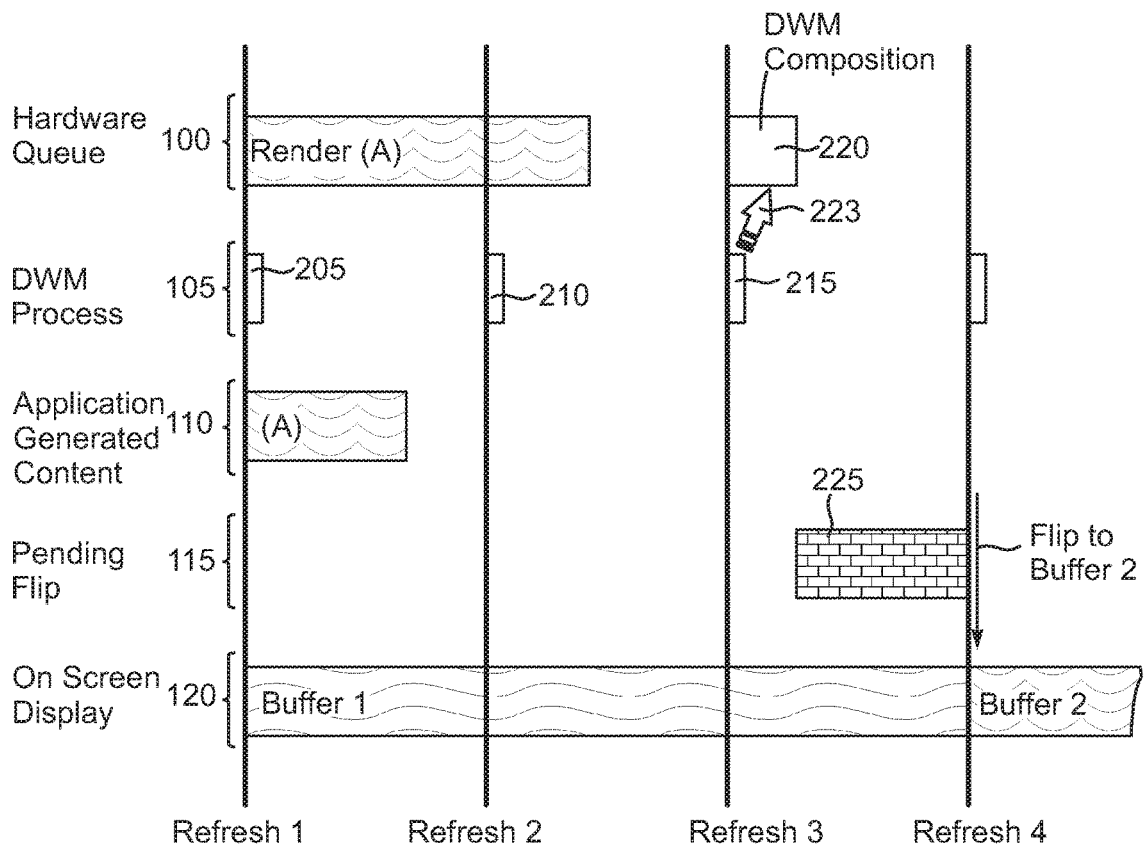
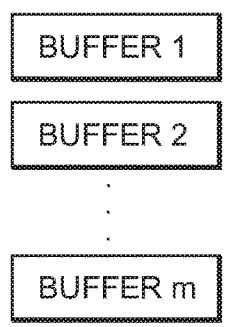
FIG. 7
(PRIOR ART)

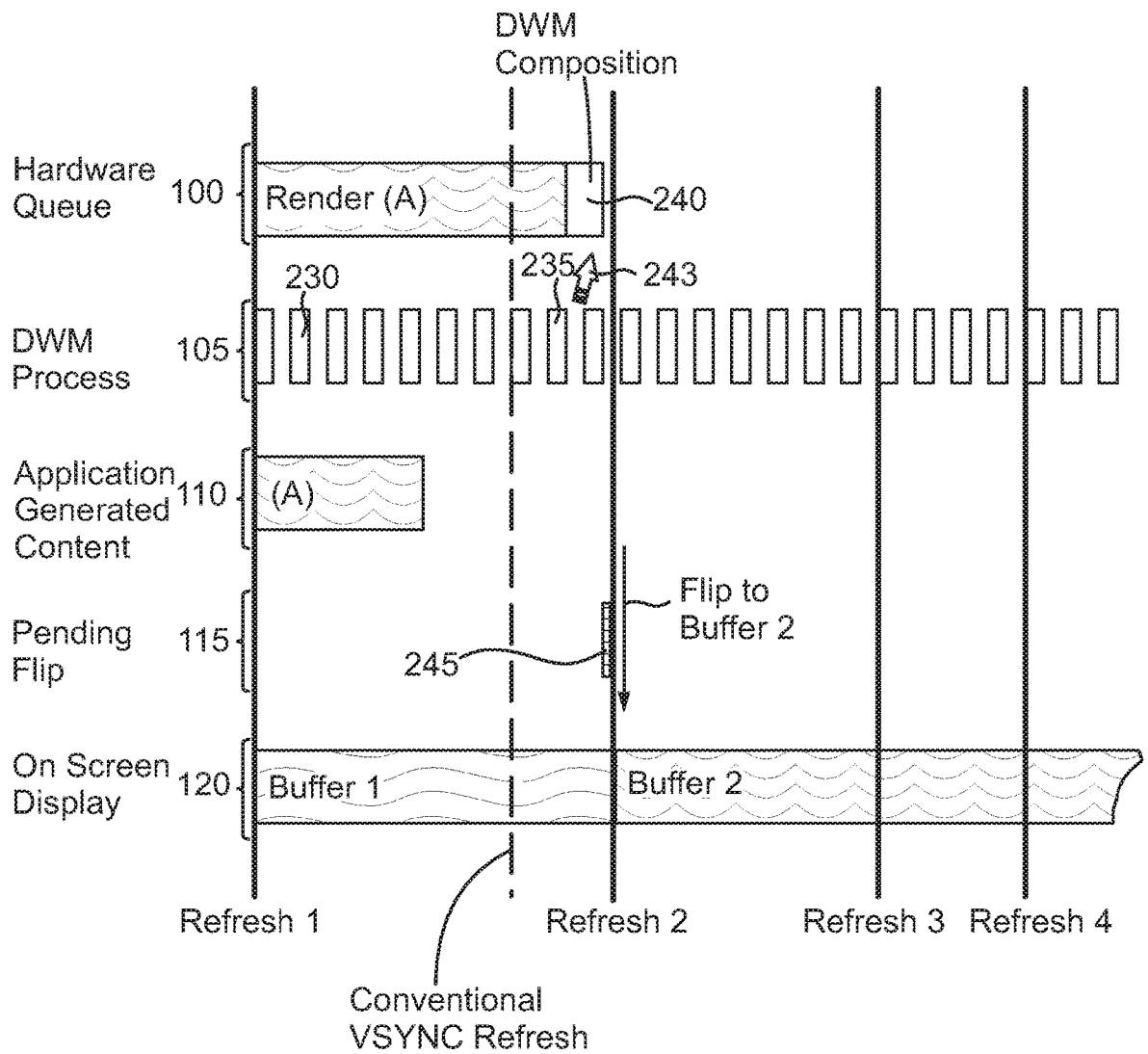
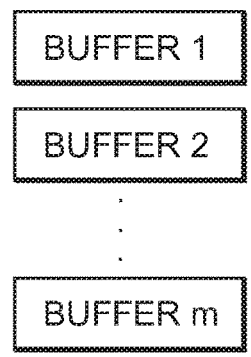
FIG. 8

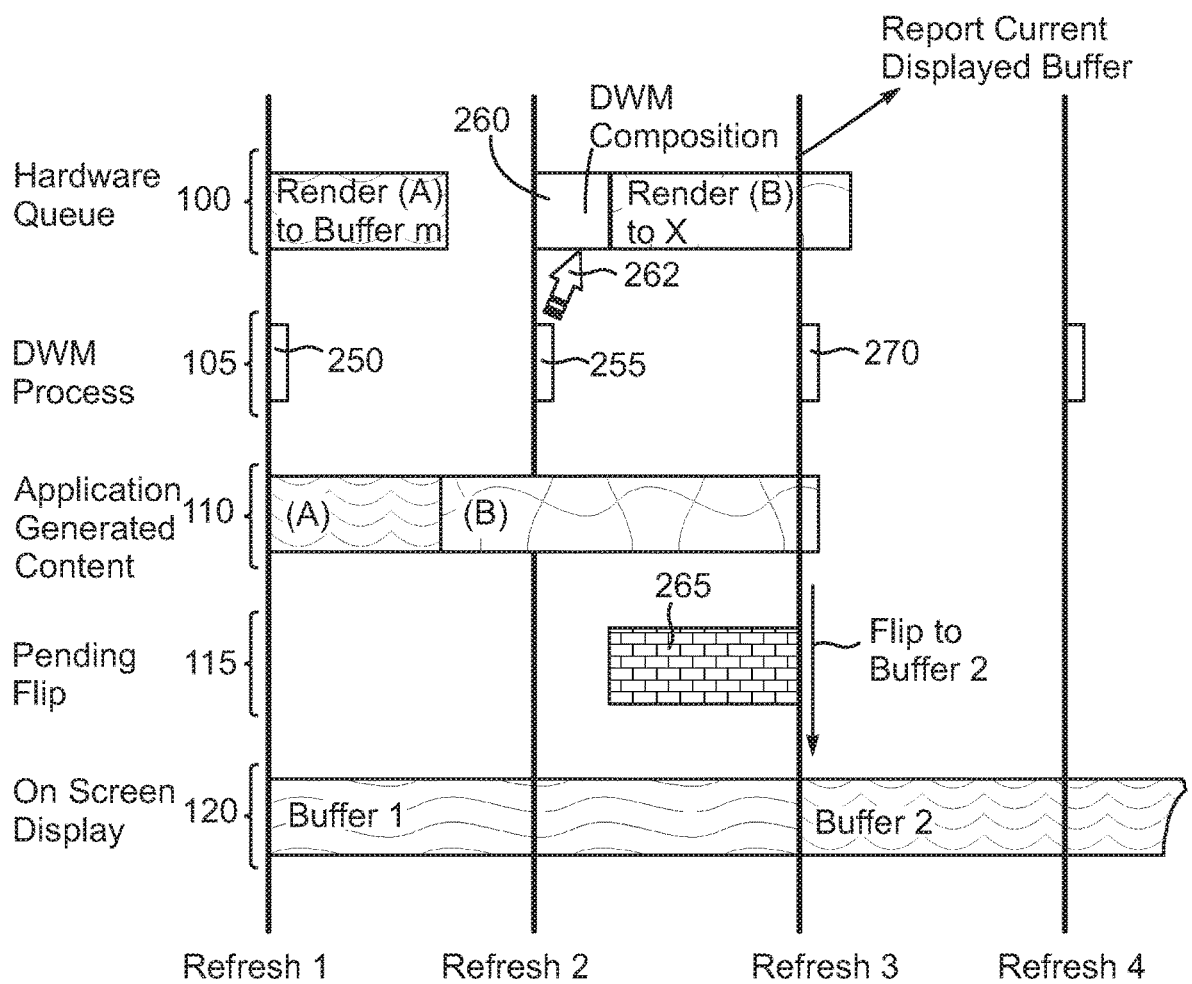
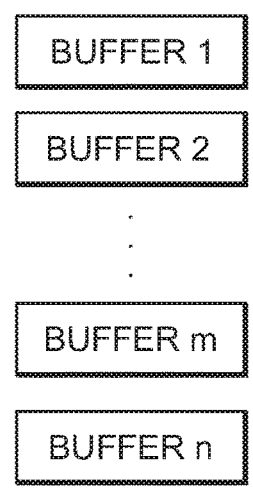
FIG. 9
(PRIOR ART)

METHOD AND APPARATUS FOR DYNAMICALLY REDUCING APPLICATION RENDER-TO-ON SCREEN TIME IN A DESKTOP ENVIRONMENT

BACKGROUND OF THE INVENTION

1. Field of the Invention

This invention relates generally to computing systems and software, and more particularly to computing systems and software for displaying graphical content.

2. Description of the Related Art

Most modern computer operating systems include the capability to display applications in fullscreen mode (or even full screen exclusive mode) or windowed mode. Some conventional computer monitors have a fixed refresh rate and others may be dynamically refreshed. In conventional computer systems, content for display on a monitor is first rendered or created by rendering hardware, such as a graphics processing unit (GPU), and then stored in one of two buffers, which are typically address locations in system memory or GPU memory/caches. Many conventional systems use two buffers in a so-called double buffering scheme. One buffer, typically referred to the front buffer, holds the rendered content that is currently displayed on the monitor. The other buffer, typically the back buffer, holds rendered content that is waiting to be displayed at the next appropriate time. When the operating system determines that the back buffer content should be displayed, a flip is performed, where the display switches to displaying the contents of the back buffer.

In windowed mode, the rendering process includes rendering the content of each open application along with any unoccupied portions of the desktop and taskbars and menus and thereafter compositing those individual graphical portions into a composited surface that is then displayed frame after frame on the display. This latter process is known as desktop composition and usually performed by an operating system process called a desktop compositor. The desktop compositor is a system process that typically wakes up at a fixed interval tied to the refresh rate of the monitor in order to compose multiple application windows into a single surface that is scanned out and displayed on the monitor.

Conventional operating systems often use a process called vertical synchronization or VSYNC to avoid a phenomena known as "tearing" where the display shows portions of two rendered frames that have different content. When VSYNC is enabled, each buffer flip can only occur after each refresh. This effectively caps the frame rendering rate at the monitor refresh rate. VSYNC also sets the fixed interval when the desktop compositor wakes.

Current applications running in full screen exclusive mode have very minimal latency (<1 ms) between when an application completes its rendering to when the content appears on monitors with dynamic refresh rate technology. This is due to the fact that the application directly controls the flip to the back buffer and then initiate the flip immediately after rendering is completed.

However for windowed applications that have the extra step of desktop composition, the latency is very high and can potentially reach as high as 33.3 ms for a typically 60 Hz display. This delay includes: (1) time spent waiting for the desktop compositor thread to wake up; and (2) time spent waiting for the VSYNC boundary (the next fixed refresh) before the rendering hardware can flip the front and back buffers. This results in noticeable visual stuttering. If it were possible to minimize or at least reduce this latency, windowed applications could perform close to the performance of full screen exclusive mode applications, and achieve a low latency and stutter-free visual experience on dynamic refresh rate monitors.

Windows® 10 introduced an emulated full screen exclusive mode that has the low latency advantages of traditional full screen exclusive, and also the convenience of quick task switching. However, this implementation does not cover all windowed applications, and also has limitations based on whether the GPU is able to seamlessly flip between two completely different surface formats (desktop compositor surface vs. application surface).

In another conventional technique, the user may choose to run directly in Full screen Exclusive mode for a low latency experience. But the drawbacks include long task switch time when focus switches between applications, especially in multi-display configurations where the user may switch between using applications running on different monitors. Another drawback is that some applications do not have the option to run in Full screen Exclusive mode at all. In addition, the desktop compositor cannot overlay useful content, such as volume or brightness controls, on the screen.

The present invention is directed to overcoming or reducing the effects of one or more of the foregoing disadvantages.

SUMMARY OF THE INVENTION

In accordance with one aspect of the present invention, a system is provided that includes a computing device operable to render video content for display on a display device and to periodically refresh that display device. The video content includes at least one application window. A desktop compositor is operable to wake and execute commands to compose video frames that are composited surfaces that include the at least one application window and to initiate a buffer flip to deliver the video frames to the display device. A high resolution timer is operable to cause the desktop compositor to wake and execute the commands in multiple instances between display refreshes.

In accordance with another aspect of the present invention, a method is provided that includes rendering video content for display on a display device and periodically refreshing that display device. The video content includes at least one application window. A desktop compositor is operated to wake and execute commands to compose video frames that are composited surfaces that include the at least one application window and to initiate a buffer flip to deliver the video frames to the display device. A high resolution timer is operated to cause the desktop compositor to wake and execute the commands multiple in multiple instances between display refreshes.

In accordance with another aspect of the present invention, in a system that includes a computing system having a display device and being operable to render video content for display on the display device and to periodically refresh that display device, the video content including at least one application window, a method includes rendering video content for display on a display device and periodically refreshing that display device. A desktop compositor is operated to wake and execute commands to compose video frames that are composited surfaces that include the at least one application window and to initiate a buffer flip to deliver the video frames to the display device. A high resolution timer is operated to cause the desktop compositor to wake and execute the commands in multiple instances between display refreshes.

In accordance with another aspect of the present invention, a non-transitory computer readable medium has computer readable instructions for performing a method. The method includes rendering video content for display on a display device and periodically refreshing that display device. The video content includes at least one application window. A desktop compositor is operated to wake and execute commands to compose video frames that are composited surfaces that include the at least one application window and to initiate a buffer flip to deliver the video frames to the display device. A high resolution timer is operated to cause the desktop compositor to wake and execute the commands in multiple instances between display refreshes.

BRIEF DESCRIPTION OF THE DRAWINGS

The foregoing and other advantages of the invention will become apparent upon reading the following detailed description and upon reference to the drawings in which:

FIG. 5 is an activity diagram like FIG. 4, but depicting a simplified exemplary conventional video rendering and buffer flipping method;

FIG. 7 is an activity diagram like FIG. 5, but depicting another simplified exemplary conventional video rendering and buffer flipping method;

FIG. 8 is an activity diagram like FIG. 7, but depicting another exemplary embodiment of a new video rendering and buffer flipping method;

FIG. 9 is an activity diagram like FIG. 7, but depicting additional aspects of the simplified exemplary conventional video rendering and buffer flipping method;

DETAILED DESCRIPTION OF SPECIFIC EMBODIMENTS

Various embodiments of computing systems operable to render video with applications in windowed mode are disclosed. One variation is operable to render video content for display on a display device and to periodically refresh that display device. The video content includes at least one application window. A desktop compositor, which may be an operating system process, is operable to wake and execute commands to compose video frames that are composited surfaces that include the at least one application window and to initiate a buffer flip to deliver the video frames to the display device. A high resolution timer is operable to cause the desktop compositor to wake and execute the commands in multiple instances between display refreshes. In conventional systems, the desktop compositor only wakes and executes once after each refresh cycle, which introduces delays in buffer flipping. Additional details will now be described.

Figure 1:
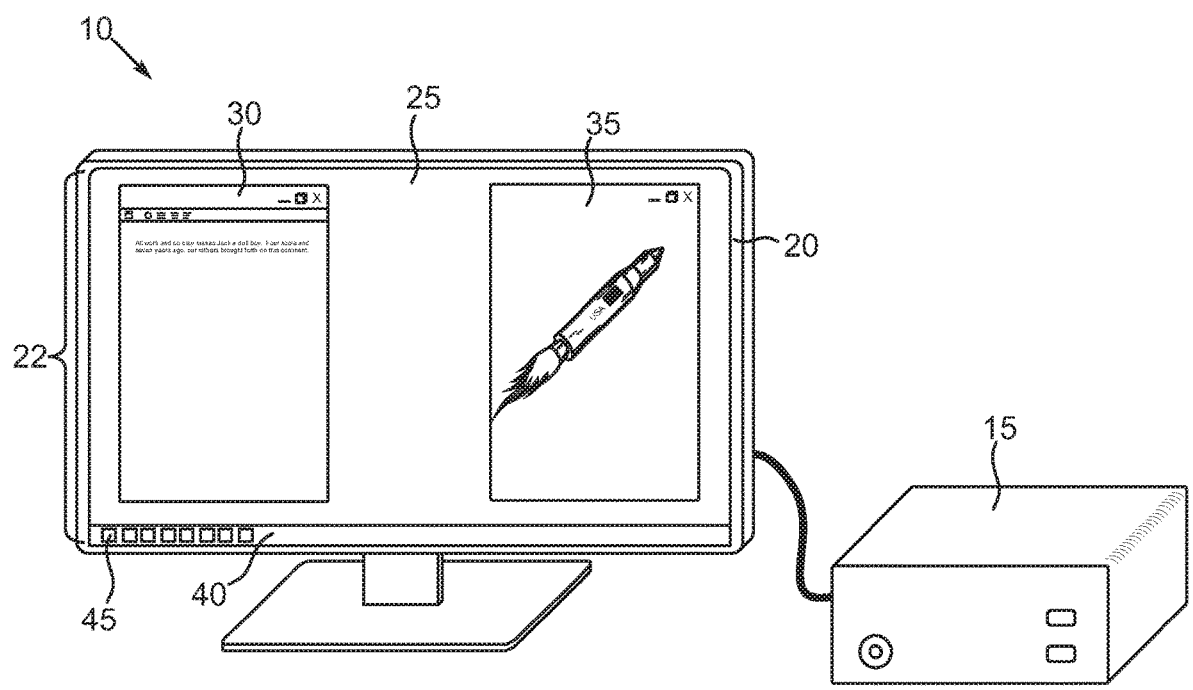
FIG. 1 is a pictorial view of an exemplary embodiment of a computing system that includes a computer and a display or monitor.

In the drawings described below, reference numerals are generally repeated where identical elements appear in more than one figure. Turning now to the drawings, and in particular to FIG. 1, therein is depicted a pictorial view of an exemplary embodiment of a computing system 10 that includes a computer 15 and a display or monitor 20 connected to the computer 15. In alternative embodiments, the computer 15 and the display 20 may be integrated into a single case. The display 20 may be any of a variety of technologies such as LCD, OLED, plasma or other technologies. The display 20 advantageously is capable of dynamic refresh as described in more detail below. The computer system 10 may include various input devices such as mice and keyboards which are not shown for simplicity of illustration.

The computer 15 may utilize one or more operating systems such as Windows®, Linux, IOs or others. Indeed, the techniques described herein may be, in many ways, platform agnostic. In this illustrative embodiment, operating system software is displaying a surface 22 or content on the display 20 that includes a desktop 25, two exemplary windowed applications 30 and 35 that are open and some task bar 40 that includes some number of icons 45. The applications 30 and 35 may, of course, number more than two and indeed may be between one and some unspecified number. As described in more detail below, the combination of the desktop 25 and the opened windowed applications 30 and 35 make up the composited surface 22 that is dynamically refreshed.

Figure 2:
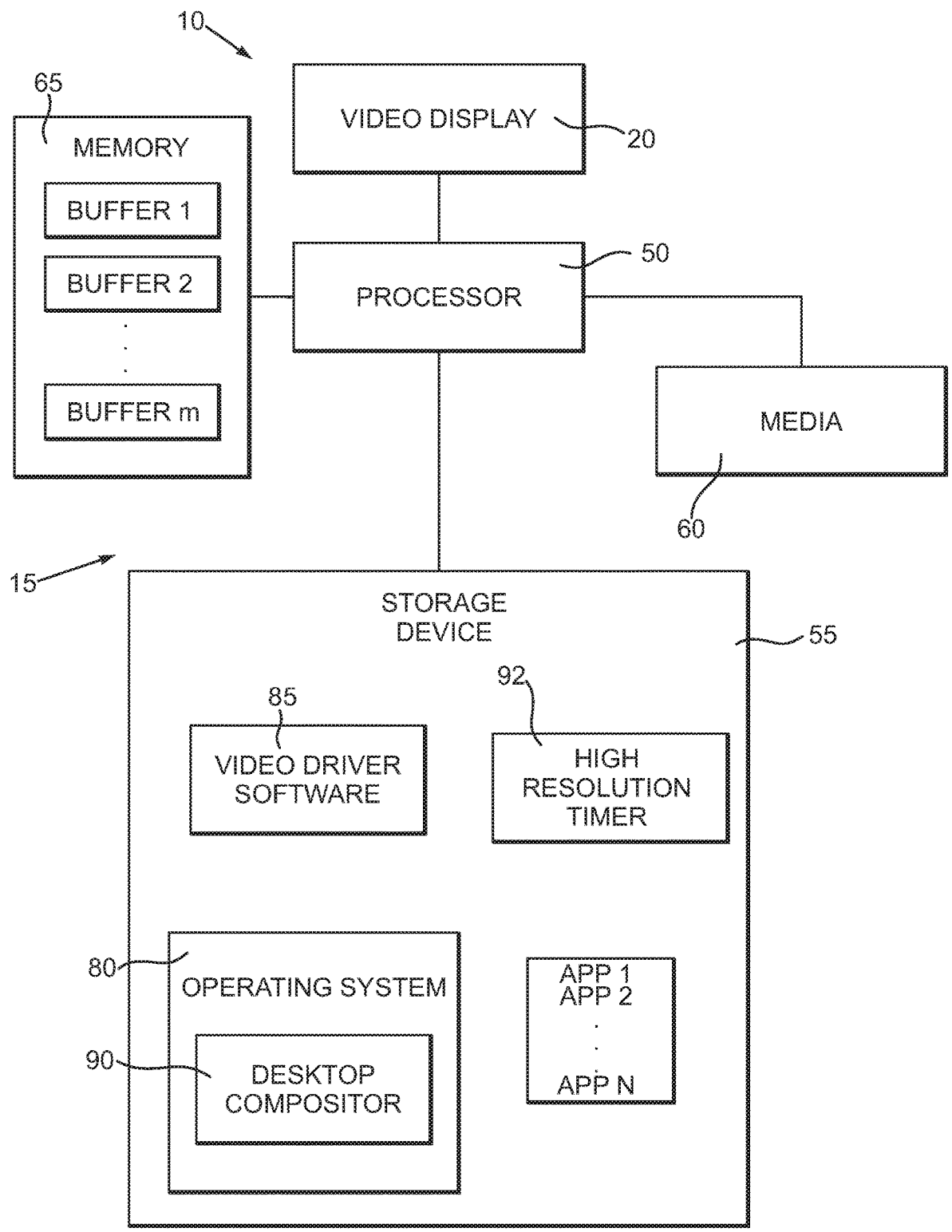
FIG. 2 is a block diagram of the exemplary computing system.

Additional details of the computing system 10 may be understood by referring now also to FIG. 2, which is a block diagram. The computing device 10 may include the aforementioned display 20, a processor 50 or processors, a storage device 55, media 60, and memory 65. The processor 50 may be an integrated circuit dedicated to video processing, a microprocessor, graphics processing unit (GPU), an accelerated processing unit (APU) that combines microprocessor and graphics processor functions, an application specific integrated circuit or other device. An exemplary APU may include fixed function cores for compression, decompression, pre-imposed or post-imposed processing tasks or others. Indeed, the processor 50 may consist of multiple examples of such integrated circuits operating in parallel or otherwise. The storage device 55 is a computer readable medium and may be any kind of hard disk, optical storage disk, solid state storage device, ROM, RAM or virtually any other system for storing computer readable media. The media 60 may include media supplied by satellite tuner, cable set top box, optical disk player, internet streaming, a removable storage device or a hard drive. These represent just a few examples of the types of media that may be used to deliver video content to the processor 50 and thus the display 20 depicted in FIG. 1. The memory 65 may be one or more discrete memory devices, such as DRAM, SRAM, VRAM or flash chips, boards or modules or onboard cache(s) or combinations of these. The memory 65 may be subdivided into, among various things, plural buffers, buffer 1, buffer 2 . . . buffer m. The buffers buffer 1, buffer 2 . . .

buffer m are addressable memory locations that may be used for double, triple or other buffering for displaying video frames as described in more detail below.

In addition, the computing device 10 includes an operating system 80, video driver software 85, a desktop compositor 90, a high resolution timer 92, and may include plural applications, which are abbreviated APP 1, APP 2 . . . APP n, and which may be drivers, software applications, or other types of applications. For example, APP 1 when opened may correspond to the windowed application 30 and APP 2 when opened may correspond to the windowed application 35 shown in FIG. 1. The operating system 80, the video driver software 85, a high resolution timer 90, a desktop compositor 90 and the applications APP 1 . . . APP n may be stored on the storage device 55. As noted above, the operating system software 80 may be any of a great variety of different operating systems. The video driver software 85 may similarly be suitable for various different types of operating system platforms.

The desktop compositor 90 (also termed DWM process) may be part of the operating system 80 as shown and function as a system process. One or more (and two in the case of double buffering) of the buffers Buffer 1, Buffer 2 . . . Buffer m may be allocated by each of the applications APP 1, APP 2 . . . APP n to store rendered application content. In addition, one or more of the buffers (and two in the case of double buffering) buffer 1, buffer 2 . . . buffer m may be allocated by the desktop compositor 90 to store composited rendered content.

As described in more detail below, the high resolution timer 92 is designed to modify the way in which the desktop compositor 90 creates, for example, the desktop surface 22, which is the composition consisting of the desktop 25 and the opened applications 30 and 35 depicted in FIG. 1, with a technical goal of reducing the latency between the various operations required to create the desktop composition and the actual display of the desktop composited surface 22 on the display 20. The high resolution timer 92 may be implemented in the video driver software 85, the operating system software 80 or even as firmware, perhaps in the storage device 55 or other location. If implemented in firmware, the high resolution timer 92 should advantageously work through the video driver software 85 in order to implement the desired functionality.

Figure 3:
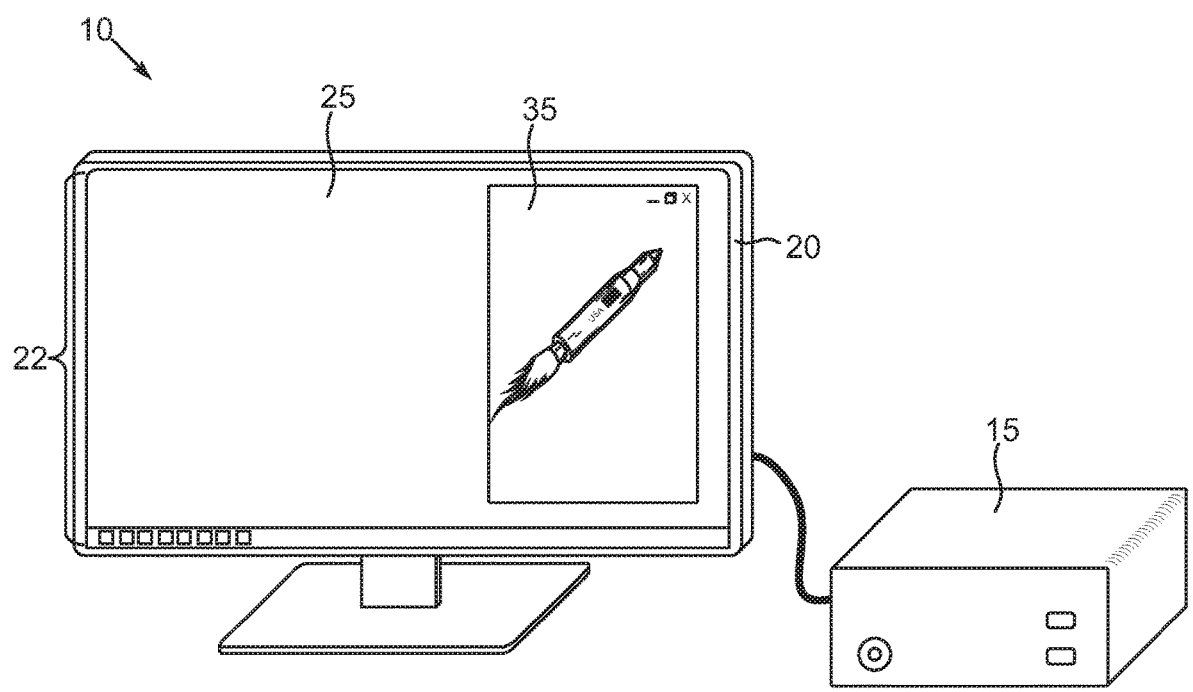
FIG. 3 is a pictorial view like FIG. 1, but depicting a single windowed mode application on a display.
Figure 4:
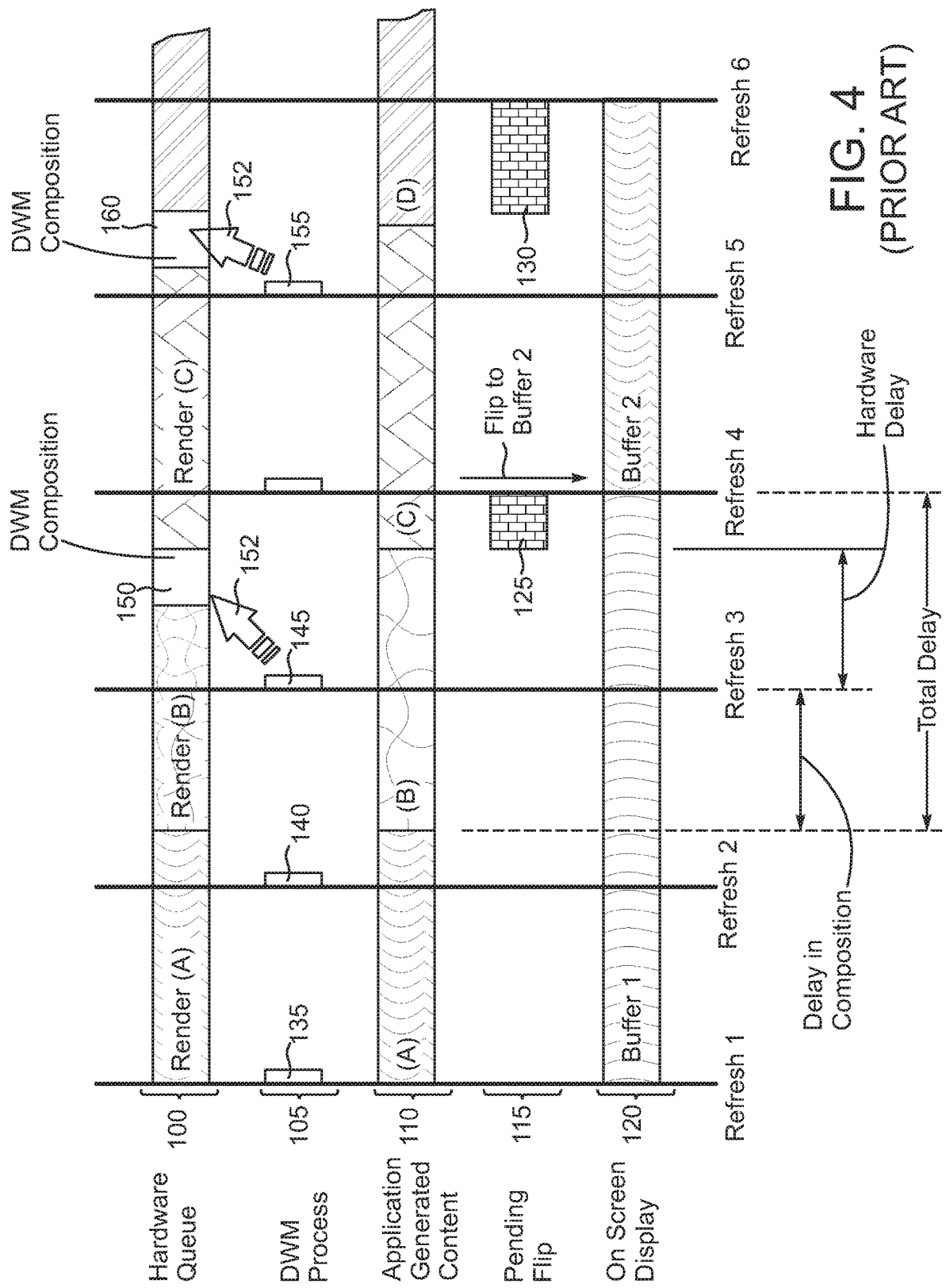
FIG. 4 is an activity diagram depicting an exemplary conventional video rendering and buffer flipping method.

An exemplary conventional technique for rendering video using the desktop compositor 90 may be understood by referring now to FIGS. 2, 3 and 4. FIG. 3 is a pictorial view of the computing system 10 initially displaying the desktop 25 and the windowed application 35 only, i.e. the desktop surface 22 consisting of the desktop 25 and the windowed application 35. FIG. 4 is an activity diagram that is akin to a timing diagram that depicts the various hardware and software activities associated with displaying the desktop surface 22 depicted in FIG. 3. Going from top to bottom, FIG. 4 depicts a Hardware Queue stream 100, a Desktop Compositor (DWM) Process stream 105, an Application Generated Content stream 110, a Pending Flip stream 115 and an On Screen Display stream 120. The Hardware Queue stream 100 represents the hardware rendering of content. The rendered content may be Application Generated Content, such as the rendering of the content of the windowed application 35 in FIG. 3, and the rendering of composited content, such as the rendering the composited surface 22 in FIG. 3. The rendering is performed by whatever hardware is actually writing video frames. This may be the processor 50 depicted in FIG. 2 or a discrete GPU if a GPU is implemented in the computing system 10, the two in concert or some other device(s). The DWM Process stream 105 depicts the periodic waking of the DWM Process (i.e., the desktop compositor 90) within the operating system software 80 shown in FIG. 2 to perform a variety of functions to be described in more detail below. The Application Generated Content stream 110 depicts new content, for example Content (A), generated by a particular application. This may be, for example, some updated video information for the windowed application 35 shown in FIG. 3 that is to be rendered on the display 20. The Pending Flip stream 115 depicts when the desktop compositor 90 initiates a buffer flip between two DWM allocated buffers, say from Buffer 1 to Buffer 2 (and ultimately for delivery to the display 20) and indicates where there are delays in the flip between Buffer 1 and Buffer 2, such as the delays 125 and 130 depicted. These delays 125 and 130 will be explained in more detail below. Finally, the On Screen stream 120 depicts what is actually being currently displayed on the display 20. For example, the contents of Buffer 1 is initially being displayed on the display 20, and Buffer 1 may be storing the desktop surface 22 that has been rendered and delivered from the processor 50 or whatever processor is on board.

Still referring to FIG. 4, note that periodic refresh lines, Refresh 1, Refresh 2, Refresh 3, Refresh 4, Refresh 5 and Refresh 6 are depicted. These represent individual refreshes of the display 20. In a conventional system and as depicted in FIG. 4, Refresh 1 and Refresh 2, etc. occur at specified fixed points in time that are set by a conventional vertical synchronization code termed VSYNC. When VSYNC is enabled, the frame rendering rate is effectively capped at the monitor refresh rate. As shown in the DWM Process stream 105, an instance of a DWM process wake/execute occurs immediately after each refresh, i.e., Refresh 1, Refresh 2, etc. For example, after Refresh 1, a DWM process wake/execute instance 135 occurs. At this point an application is generating Content (A), which again may simply be an updated frame for the application 35 depicted in FIG. 3. As shown by the On Screen stream 120, the contents of Buffer 1, which is the desktop surface 22 as shown in FIG. 3, is being displayed. There is no pending buffer flip as shown in the Pending Flip stream 115 after Refresh 1 for the reasons to be described below. The DWM process wake/execute instance 135 looks for available rendered content, and if rendered content is available, then informs the video driver 85 of the address location of the available content, (it might be Buffer m). The DWM process wake/execute instance 135 then closes. The video driver 85 then programs the new buffer address (say buffer m) into the processor 50 (or GPU if on board), and the processor initiates the next refresh. If rendered content is not sensed, the DWM process wake/execute instance 135 closes and awaits the next refresh. Following Refresh 2 but prior to Refresh 3, the next DWM process wake/execute instance 140 occurs and during this period the Application Generated Content (A) is complete and the updated Content (A) completes rendering as shown in the Hardware Queue stream 100. This rendered Content (A) will be stored in an application allocated buffer, for example Buffer m. However, because the DWM process wake/execute instance 140 has already opened and closed prior to the completion of the rendering of Content (A) a delay is first introduced. There are three potential sources of delay: the delay in composition, a hardware delay and pending flip delay. These sources are additive and will be described further below. It would be advantageous to be able to initiate a DWM composition using, for example, the desktop compositor 90 shown in FIG. 2 at this point so that a flip from DWM Buffer 1 to buffer 2 may occur. However, the composition process cannot occur since the DWM Process instance 140 has already occurred and the next one does not occur until Refresh 3. Thus, the onscreen content is still Buffer 1. Following Refresh 3, the next DWM process wake/execute instance 145 occurs. At this point, the Rendered (A) content has been loaded into the application allocated buffer, Buffer m, and as the Hardware Queue stream 100 indicates, the rendering hardware has begun to render Application Generated Content (B), which again may be completely new content or simply an updated frame. But note that the DWM composition process which could have occurred at the conclusion of the Render A point in the Hardware Queue stream 100 has been delayed at least until the Refresh 3 when the DWM process wake/execute instance 145 occurs. If there were no hardware delay immediately after Refresh 3, then the DWM composition process 150 shown in the Hardware Queue 100 could occur immediately. However, FIG. 4 depicts a typical exemplary hardware delay which may be caused by complexities associated with rendering Content (B) or a variety of other factors. Thus, in this illustrative example, the DWM composition process 150 is not completed until some time shortly before Refresh 4. The DWM process wake/execute instance 145 will sense the availability of application Content (A) and, as represented by the arrow 152, prompt the rendering hardware to perform the DWM composition process 150 as reflected in the Hardware Queue 100. The DWM composition process 150 involves taking the contents of the desktop 25 and the windowed application 35 (which is currently stored in Buffer m, the application allocated buffer), composing from those two the desktop surface 22, which is the composite of the two, and then storing that composited desktop surface 22 in Buffer 2, the other DWM allocated buffer. At the conclusion of the DWM composition process 150, the contents of the desktop surface 22 shown in FIG. 3 are written to Buffer 2. However, a flip from Buffer 1 to Buffer 2 cannot occur until the next refresh, namely Refresh 4. Thus, the flip delay 125 is introduced. Prior to Refresh 4, the on screen content is still Buffer 1 but note that an application has generated Application Generated Content (C) and the Hardware Queue 100 now represents the rendering of the Application Generated Content (C). At Refresh 4, the flip to Buffer 2 occurs and thus the On Screen Display stream 120 reflects that the contents of Buffer 2 is now on the display 20. Looking back at the time line between Refresh 2 and Refresh 4, it is evident that there are three possible components of latency, the delay in composition between the rendering of Content (A) in the Hardware Queue 100 and the next refresh, Refresh 3 plus a typical hardware delay between Refresh 3 and the conclusion of the DWM composition process 150 and finally the flip delay 125 between the conclusion of the DWM composition process 150 and the next refresh, Refresh 4.

Still referring to FIG. 4, between Refresh 4 and Refresh 5, the Application Generated Content continues to be Content (C) and the rendering of (C) continues as shown in the Hardware Queue 100. Following Refresh 5, the DWM process wake/execute instance 155 will sense the availability of application Content (B) (i.e., the Render (B) is complete) and, as again represented by the arrow 152, prompt the rendering hardware to perform the next DWM composition process 160 as reflected in the Hardware Queue 100. At the conclusion of the next DWM composition process 160, a composited content frame is written to Buffer 1. However, the flipping of the content from Buffer 2 back to Buffer 1 cannot occur, due to the VSYNC imposed refresh points, until the next refresh, which is Refresh 6 thus introducing the aforementioned flip delay 130.

The disclosed embodiments are directed, in part, to eliminating some of the sources of delay just described and depicted in FIG. 4. Before describing an exemplary new technique in accordance with the disclosed embodiments, it may be useful to first describe a simplified process flow again using FIG. 3, but now also using FIG. 5, which is an activity diagram like FIG. 4 but simplified down to only include the rendering of Content (A) and only four refresh cycles. Following that description of the conventional process, reference will be made to FIG. 6 and an exemplary new process for rendering the same content and by utilizing the high resolution timer 92 depicted in FIG. 2 and described briefly above.

FIG. 5, like FIG. 4, depicts the Hardware Queue stream 100, the DWM Process stream 105, the Application Generated Content stream 110, the Pending Flip stream 115 and the On Screen Display stream 120. Assume for the purposes of this illustration that the frame rendering rate is faster than the display refresh rate. Again assume for the purposes of this illustration that initially the On Screen Display stream 120 reflects that the contents of Buffer 1, which is simply whatever the current desktop surface 22 is on the display 20 in FIG. 3. Further assume that at Refresh 1, an Application Generated Content (A) begins generation, again by way of the operating system 80 depicted in FIG. 2 and that the DWM process wake/execute instance 170 occurs. Also at Refresh 1, and as shown in the Hardware Queue stream 100, the rendering hardware begins to render Content (A). As shown in the Hardware Queue stream 100, the rendering (Render (A)) of Content (A) is completed between Refresh 1 and Refresh 2. However, since Refresh 2 occurs at a fixed point, the DWM composition process 150 has to wait until Refresh 2, which introduces a delay in composition. Next at Refresh 2, the next DWM process wake/execute instance 175 occurs. The DWM process wake/execute instance 175 senses the available rendered Content (A) and prompts the DWM composition process 150 as reflected in the arrow 177. The DWM composition process 150 may proceed and results in a rendered composited desktop 22 being stored in Buffer 2. At the conclusion of the DWM composition process 150, flip from Buffer 1 to Buffer 2 cannot occur but must await until Refresh 3 thus introducing a flip delay 180. Finally, at Refresh 3 the next instance of DWM Process 185 occurs and a flip from Buffer 1 to Buffer 2 occurs as shown in the On Screen Display stream 120. Thus, two full frames, that is, from Refresh 1 to Refresh 2 and from Refresh 2 to Refresh 3, are required in order to go from the beginning of the rendering of (A) to the display of (A) as the composited desktop surface 22. The delay of course is a combination of the delay in composition and the flip delay 180.

Figure 6:
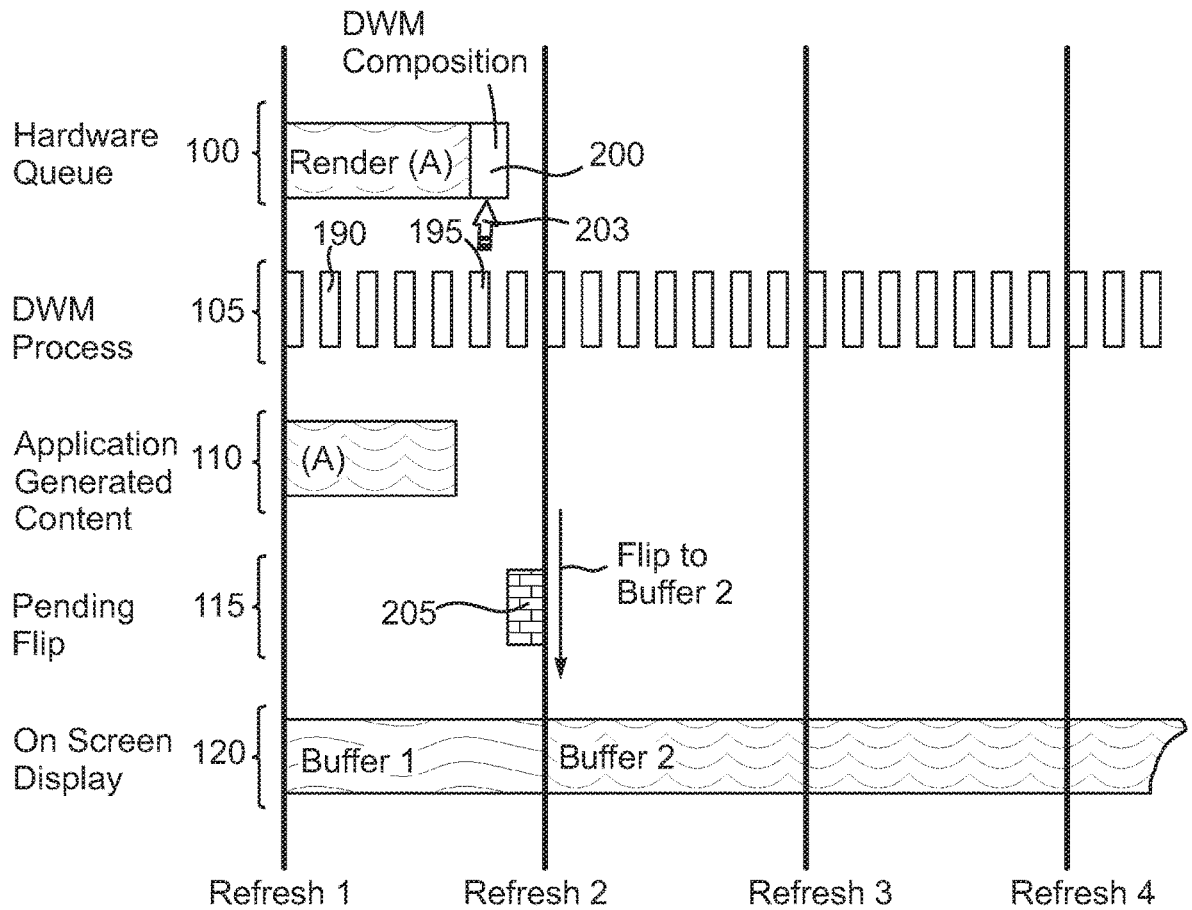
FIG. 6 is an activity diagram like FIG. 5, but depicting an exemplary embodiment of a new video rendering and buffer flipping method.

An exemplary new technique may be understood by referring now to FIGS. 2, 3 and 6. FIG. 6, like FIG. 5, depicts the Hardware Queue stream 100, the DWM Process stream 105, the Application Generated Content stream 110, the Pending Flip stream 115 and the On Screen Display stream 120. Like the hypothetical depicted in FIG. 5, only four refresh cycles, Refresh 1, Refresh 2, Refresh 3 and Refresh 4, are depicted and it is assumed that initially that the contents of Buffer 1 is depicted on the display 20 shown in FIG. 3. Again for this comparison, the frame rendering rate is faster than the display refresh rate. After Refresh 1, the Application Generated Content (A) is delivered to rendering hardware as shown in the Hardware Queue stream 100 rendering (Render (A)) of Content (A) begins. Instead of using a single instance of a DWM process wake/execution per refresh as in the conventional technique depicted in FIG. 5, the DWM Process stream 105 reflects that there are multiple DWM process wake/execution instances, two of which are labeled 190 and 195. The multiple DWM process wake/execution instances 190 and 195 are controlled by the high resolution timer 92 depicted in FIG. 2. With the high resolution timer 92, the DWM composition process is decoupled from the VSYNC timing normally imposed on the display 20. As described below, the high resolution timer 92 can be enabled automatically in response to sensing of various types of latency sensitive content or be enabled manually by user input. Furthermore, the number of DWM process wake/execution instances 190 and 195 per refresh may be user selected, operating system selected or otherwise. Indeed, the high resolution timer frequency, that is, the frequency at which the high resolution timer 92 causes DWM process wake/execution instances between refreshes, can be dynamic and change based on content in order to manage the computing overhead associated with running the high resolution timer 92. The high resolution timer 92 may be implemented in the operating system software 80, the video driver software 85, or in some other location. The high resolution timer 92 periodically causes each of the DWM process instance 190 and 195 by periodically prompting the video driver software 85 to check the current display, i.e. what buffer, say Buffer 1 or Buffer 2, is currently being displayed. The video driver software 85 then performs the requested check and reports to the operating system 80 the results of the check, i.e., which buffer, Buffer 1 or Buffer 2, is currently being displayed. This report prompts the operating system 80 to initiate the next DWM wake/execution instance. For each of the DWM process wake/execution instances, for example the instances 190 and 195, the DWM process polls the contents of any application allocated buffers, say Buffer m, and makes a determination if the rendering hardware should commence with a DWM composition process. For example, if the DWM process wake/execution instance 190 occurs when rendering of (A) (Render (A)) is not complete, then DWM composition at that point is not appropriate. However, upon the DWM process wake/execution instance 195, the rendering of (A) (Render (A)) is complete and that rendered content (A) is stored in Buffer m, the application allocated buffer. At that moment the DWM process wake/execution instance 195 prompts the rendering hardware to commence a DWM composition process 200 as suggested by the arrow 203 and reflected in the Hardware Queue stream 100. Note that this occurs prior to Refresh 2, which is earlier than the conventional techniques disclosed herein. During the DWM composition process 200, the desktop compositor composes a composited surface 22, which includes the contents of application allocated buffer, Buffer m, and any other portion of the desktop surface 22, and stores that composited surface 22 in Buffer 2. At this point, a flip from Buffer 1 to Buffer 2 is pending as shown in the Pending Flip stream 115 but does not occur until Refresh 2, resulting in a flip delay 205. However, since there are multiple instances 190, 195 etc. of the DWM process wake/execution between Refresh 1 and Refresh 2, a much earlier execution of a DWM composition step 200 may occur than in the conventional technique shown in FIG. 5, resulting in a relatively short flip delay 205 and ultimately a flip to Buffer 2 that can occur at Refresh 2. Thus, the process from the beginning of Render (A) to DWM composition 200 to flip to Buffer 2 and on screen display of the contents of Buffer 2 could occur in a single frame as opposed to two frames for the conventional technique depicted in FIG. 5. Note that FreeSync could be used with the disclosed embodiments.

A similar comparison between a conventional technique and a new alternate exemplary technique for rendering frames, but in this context where the rendering frames per second rate is lower than the refresh rate of the monitor, may be understood by referring now to FIGS. 2, 3, 7 and 8. FIG. 7 is an activity diagram like FIG. 5 and FIG. 8 is an activity diagram like FIG. 6. Here, FIG. 7 again depicts the Hardware Queue stream 100, the DWM Process stream 105, the Application Generated Content stream 110, the Pending Flip stream 115, the On Screen Display stream 120 and four refresh cycles Refresh 1, Refresh 2, Refresh 3 and Refresh 4. Again, it is assumed that initially the desktop surface 22 on the display 20 is the contents of Buffer 1 shown in FIG. 2. Right after Refresh 1, the Application Generated Content stream 110 and the Hardware Queue stream 100 reflect that Content (A) is delivered to the rendering hardware and rendering of (A) (Render (A)) begins. The DWM process wake/execution instance 205 occurs. At Refresh 2, the next DWM Process wake/execution instance 210 occurs but because the rendering frame rate is slower than the refresh rate, i.e., the period from Refresh 1 to Refresh 2, the rendering of Content (A) (Render (A)) is not complete as reflected in the Hardware Queue stream 100. Although Render (A) completes following Refresh 2 and prior to Refresh 3, that completion occurs after the conclusion of the DWM process wake/execution instance 210. Therefore the continued movement of the rendered content, Render (A), to DWM composition or otherwise is delayed at least until Refresh 3. At Refresh 3, the next DWM process wake/execution instance 215 occurs, the rendered content from the Render (A) process is sensed and the rendering hardware is prompted, as suggested by the arrow 223, to commence a DWM composition process 220. During the DWM composition process 220, the composited desktop 22 consisting of the rendered Content (A) and any remaining portions of the desktop surface are written to Buffer 2. Following the completion of the DWM composition step 220, the flip to Buffer 2 to actually deliver the composited desktop surface 22 to the display 20 has to wait until Refresh 4, which introduces a significant flip delay 225. Finally at Refresh 4, a flip to Buffer 2 may occur to deliver the updated desktop surface 22 (including updated Content (A)) to the monitor 20 as represented on the On Screen stream 120. Note that the total delay associated with following the completion of Render (A) in the Hardware Queue 100 is over one frame and may be as great as two frames. Furthermore, three full frames, that is Refresh 1 to Refresh 4, have occurred between the commencement of Render (A) and the actual display of (A) as part of the desktop surface 22.

In contrast, and as shown in FIG. 8, the new exemplary technique that utilizes the high resolution timer 92 (see FIG. 2) to generate multiple DWM process wake/execution instances is shown in FIG. 8. Again, FIG. 8 depicts the Hardware Queue stream 100, the DWM Process stream 105, the Application Generated Content stream 110, the Pending Flip stream 115 and the On Screen Display stream 120. But note that the utilization of a dynamic refresh rate for the monitor 20 depicted in FIG. 3 means that the refreshes Refresh 1, Refresh 2, Refresh 3 and Refresh 4 do not occur at fixed intervals but rather at intervals determined by whatever the dynamic refresh rate is at the time of a DWM composition process. Again, initially the contents of Buffer 1 is displayed. Following Refresh 1, application generated Content (A) is called up by the operating system 80 depicted in FIG. 2 and thus the Hardware Queue 100 shows that Render (A) commences as well. The high resolution timer 92 depicted in FIG. 2 produces the multiple DWM process wake/execution instances, two of which are labeled 230 and 235, respectively. Note that in the conventional context, the Refresh 2 would occur where the conventional VSYNC refresh point illustrated by the dashed vertical line would occur. However, because dynamic refresh is implemented, Refresh 2 can occur later and thus with a lower refresh rate between Refresh 1 and Refresh 2 than would be provided by VSYNC. Thus, after some number of DWM process wake/execution instances, and in this case DWM process wake/execution instance 235, the rendering of (A) (Render (A)) is complete and this is sensed by the DWM process wake/execution instance 235. The DWM process wake/execution instance 235 signals the rendering hardware to commence a DWM composition process 240 as suggested by the arrow 243 and reflected in the Hardware Queue stream 100. During the DWM composition process 240, the rendering hardware renders a composited surface that includes rendered Content (A) and any other portion of the desktop surface 22 (see FIG. 3) and writes that composited desktop surface 22 to Buffer 2. At the conclusion of the DWM composition process 240, a user configurable and potentially very short flip delay 245 may be introduced followed immediately by Refresh 2 and a flip from Buffer 1 to Buffer 2. The length of the flip delay 245 may be set by the high resolution timer 92 and may take on a variety of values. In an exemplary embodiment, examples include 0.5 to 20 milliseconds. Thus, instead of requiring three full frames to deliver a composited surface 22 (including Content (A)), the new technique utilizing the dynamic refresh and the more frequent DWM Process wake/execution instances steps 230 and 235, etc. the Content (A) may be delivered in a single dynamically refreshed frame. Note that the frequency of the high resolution timer 92 may be static or dynamic. For example, in order to reduce the computing overhead associated with running multiple DWM process wake/execution instances, the high resolution timer frequency can be dynamically adjusted based on content. For example, a game application might generate high frame rates. During the rendering of such high frame rate content, the frequency of the high resolution timer 92 might be dynamically set to some frequency $\omega_1$. However, there may be periods where the game application has a lower frame rate. One example might be the first few seconds after application start where intro screens are displayed. During such periods of low frame rates computational intensity, the high resolution timer 92 can change to another frequency $\omega_2$ where $\omega_2 < \omega_1$. This dynamic frequency switching can occur multiple times per second and to multiple frequencies depending on the content.

Figure 10:
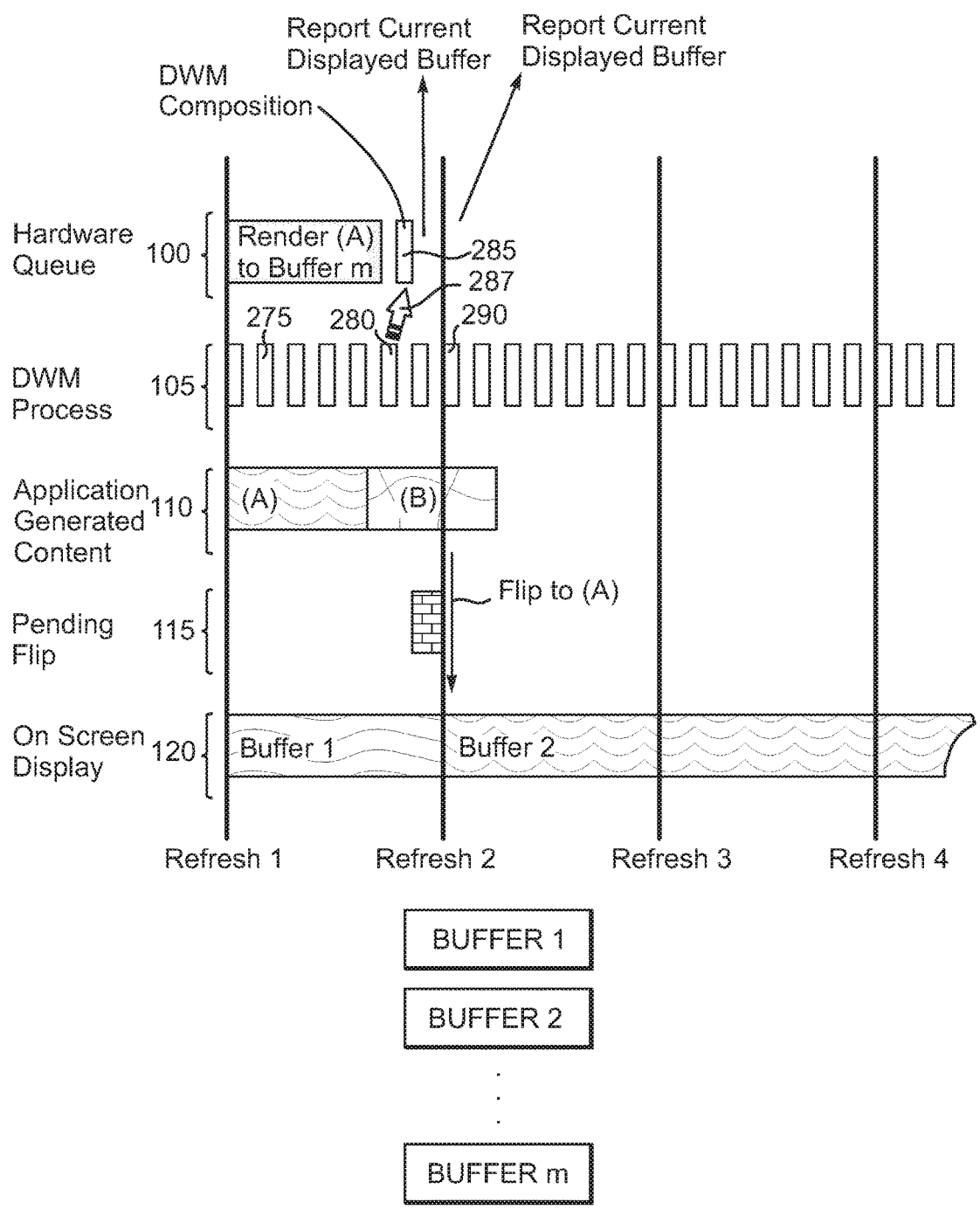
FIG. 10 is an activity diagram like FIG. 8, but depicting additional aspects of the exemplary embodiment of a new video rendering and buffer flipping method.

Another advantage associated with the disclosed exemplary embodiments over the conventional rendering techniques described herein may be understood by referring now to FIGS. 9 and 10. In this illustrative embodiment, the improved rendering process moves forward in time the points where the desktop compositor 90 depicted in FIG. 2 is informed that a flip has occurred and thus one of two buffers is freed up to begin rendering new content. FIG. 9 is an activity diagram like FIG. 5 and depicts a conventional rendering process. Again, FIG. 9 depicts the Hardware Queue stream 100, the DWM Process stream 105, the Application Generated Content stream 110, the Pending Flip stream 115 and the On Screen Display stream 120 and four refresh cycles Refresh 1, Refresh 2, Refresh 3 and Refresh 4. At Refresh 1, a first DWM process wake/execution instance 250 occurs and Application Generated Content (A) is sent by the operating system to the rendering hardware as reflected in the Hardware Queue stream 100 where the process of rendering the updated Content (A) to an application allocated Buffer m begins. At this point it is assumed that the display 20 is showing the contents of Buffer 1, which again is one of the desktop compositor 90 allocated buffers. The rendering of Content (A) to Buffer m is completed prior to Refresh 2. At the conclusion the rendering of Content (A) to Buffer m, Application Generated Content (B) is slated for rendering to another application allocated buffer, Buffer n. However this cannot occur until later as described in more detail below. Next, at Refresh 2, the next DWM Process wake/execution instance 255 occurs. The DWM Process wake/execution instance 255 senses the available rendered content (A) in Buffer m and prompts the rendering hardware to commence a DWM composition process 260 as suggested by the arrow 262 and reflected in the Hardware Queue stream 100. The DWM composition process 260 produces a composited surface 22 (see FIG. 3) that includes the rendered content (A). Following the conclusion of the DWM composition process 260, a flip from Buffer 1 to Buffer 2 must await the next refresh, Refresh 3, which introduces a flip delay 265 shown in the Flip Pending stream 115. At Refresh 3, a flip to Buffer 2 occurs such that the contents of Buffer 2, namely the product of Render (A), is delivered to the display 20 shown in FIG. 3 and as reflected in the On Screen Display stream 120. At this point in the conventional technique, the DWM Process instance 270 reports the current buffer that is being displayed and in this instance that would be Buffer 2. It is only at this point that the operating system 80 receives a report of this current buffer display and is made aware that the other buffer, Buffer 1, is now available to render the next composited content that would, in this case, include Content (B).

An exemplary embodiment of a new process is depicted in FIG. 10 and will be described in conjunction with FIGS. 2 and 3. Like FIG. 9, FIG. 10 depicts the Hardware Queue stream 100, the DWM Process stream 105, the Application Generated Content stream 110, the Pending Flip stream 115 and the On Screen Display stream 120 and four refresh cycles Refresh 1, Refresh 2, Refresh 3 and Refresh 4. At Refresh 1, the contents of Buffer 1 is displayed and Application Generated Content (A) is sent to the rendering hardware to begin the Render (A) to application allocated Buffer m process as reflected through the Hardware Queue stream 100. By way of the high resolution timer 92 depicted in FIG. 2, multiple periodic DWM process wake/execution instances 275, 280, etc. occur after Refresh 1 and prior to Refresh 2. As discussed above, the high resolution timer 92 periodically prompts the video driver software 85 to check the current display, i.e. what DWM allocated buffer, say Buffer 1 or Buffer 2, is currently being displayed. The video driver software 85 then performs the requested check and reports to the operating system 80 the results of the check, i.e., which buffer, Buffer 1 or Buffer 2, is currently being displayed. This report prompts the operating system 80 to initiate the next DWM wake/execution instance. The conclusion of the Render (A) to Buffer m process is sensed by the next available DWM process wake/execution instance, in this case the instance 280. The DWM process wake/execution instance 280 signals the rendering hardware to commence the DWM composition process 285 as suggested by the arrow 287. During the DWM composition process, the contents of Buffer m are composited with any remaining portion of the desktop surface 22 (see FIG. 3) and written to Buffer 2. In addition, at that point, the video driver software 85, as prompted by the high resolution timer 92, reports to the operating system software 80 that the currently displayed buffer is still Buffer 1. Thus, at the beginning of each of the DWM Process wake/execution instances 275, 280, etc. a report is sent by (by the current DWM process wake/execution instance) to the desktop compositor 90 of the operating system software 80 depicted in FIG. 2 reporting that the currently displayed buffer is Buffer 1 and that includes a report of the currently displayed buffer after the DWM composition step 285. This same report is repeated at every instance of the DWM wake/execution 275, 280, etc. prior to Refresh 2. At Refresh 2, a flip from Buffer 1 to Buffer 2 is made and delivered to the monitor 20. At the next DWM Process wake/execution instance 290, which occurs immediately after Refresh 2, a report that the current displayed buffer is Buffer 2, thus indicating that Buffer 1 is available for new composition. Note that this reporting of the next available buffer in this illustrative technique occurs much sooner than the reporting of the currently displayed buffer depicted in FIG. 9 that occurs at Refresh 3. Again this helps to reduce the latency due to hardware delays.

Figure 11:
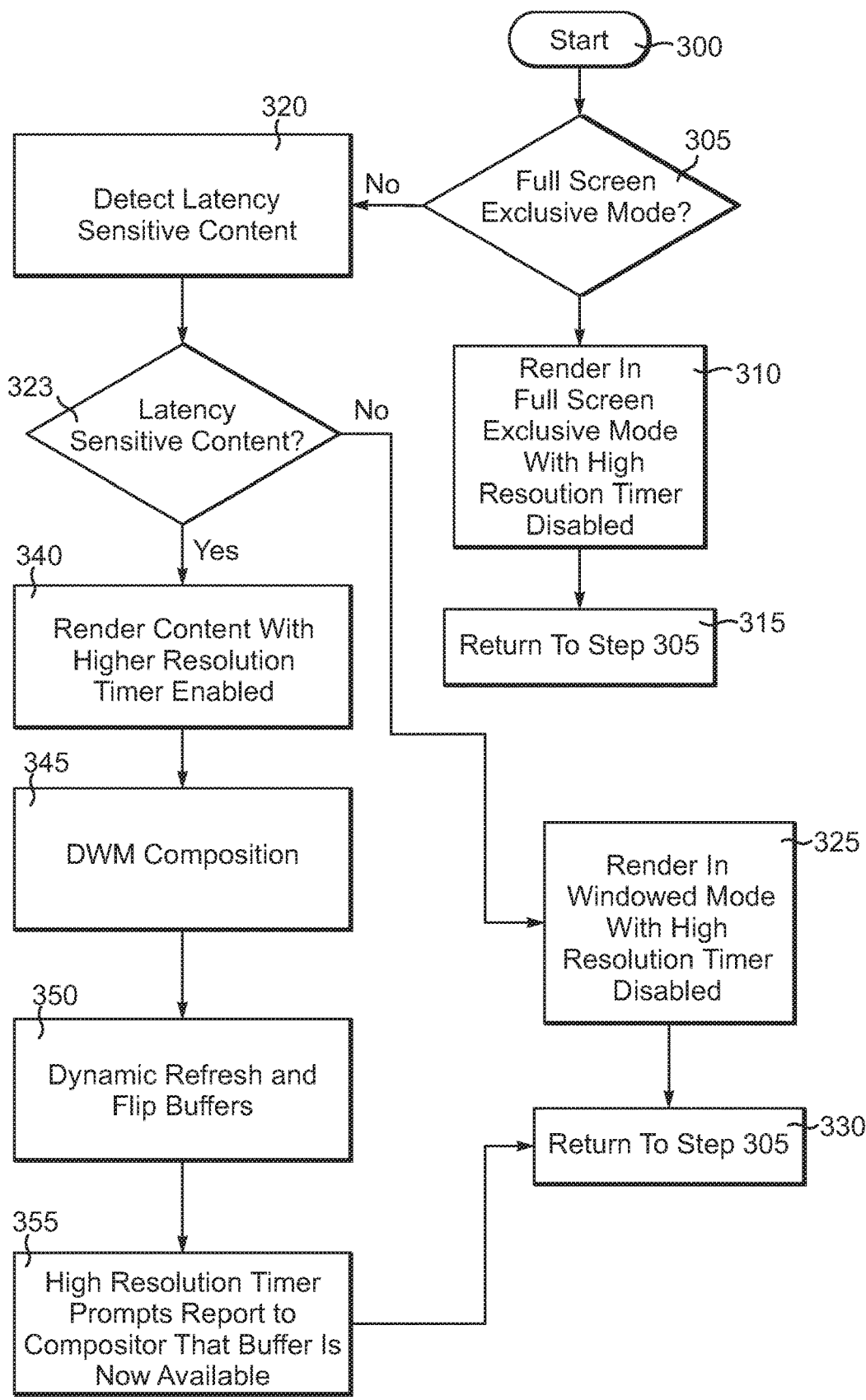
FIG. 11 is a flow chart depicting an exemplary method of rendering video content with reduced flip latency.

An exemplary process flow for operation of the computing device 10 may be understood by referring now to FIGS. 2, 3, 8 and 11. FIG. 11 is a flow chart of an exemplary process flow. After start at step 300, the computing device 10 senses if full screen exclusive mode is enabled at step 305. If full screen exclusive mode is detected, then the process proceeds to step 310 and rendering in full screen exclusive mode with the high resolution timer disabled. The process proceeds back to step 305. If, however, at step 305 full screen exclusive mode is not detected, the process to step 320 and detection of latency sensitive content. This can be done in a variety of ways. In an exemplary embodiment, the processor 50 depicted in FIG. 2 in conjunction with the video driver software 85 detects the launch of an application 35, such as a game or other, in either full screen mode or windowed mode. This may entail run time detection where the window size and the character of the foreground and background is detected and the desktop size is compared to determine if the window is full screen or not. This detection step is advantageous to only enable the high resolution timer 92 in circumstances where latency sensitive applications are running so that any extra overhead associated with the high resolution timer 92 and the more frequent desktop DWM Process wake and enable steps are avoided. If at step 323 latency sensitive content is not detected then the process proceeds to step 325 and rendering of windowed mode with the high resolution timer 92 disabled. This windowed mode can include a mode where an application is rendered full screen. Next at step 330, the process returns to step 305. If, however, at step 323, latency sensitive content is detected, then the process moves to step 340 where content is rendered with the high resolution timer 92 enabled. Thus for example as depicted in FIG. 8, this may entail the high resolution timer 92 causing multiple DWM process wake/execute instances 230, 235, etc. Next at step 345, a DWM composition process is performed. This corresponds to, for example, the DWM composition process 240 depicted in FIG. 8. Next at step 350, a dynamic refresh and buffer flip is executed. This corresponds to, for example, the dynamic refresh, Refresh 2, and the buffer flip from Buffer 1 to Buffer 2. Next at step 355, the high resolution timer 92 shown in FIG. 2 reports to the desktop compositor 90 depicted in FIG. 2 that one of the two buffers is now available. This corresponds to the report current displayed buffer report depicted in, for example, FIG. 10 at Refresh 2. At this point, the process may proceed to step 330 and ultimately back to step 305. Of course, this loop may occur many times per second.

Figure 12:
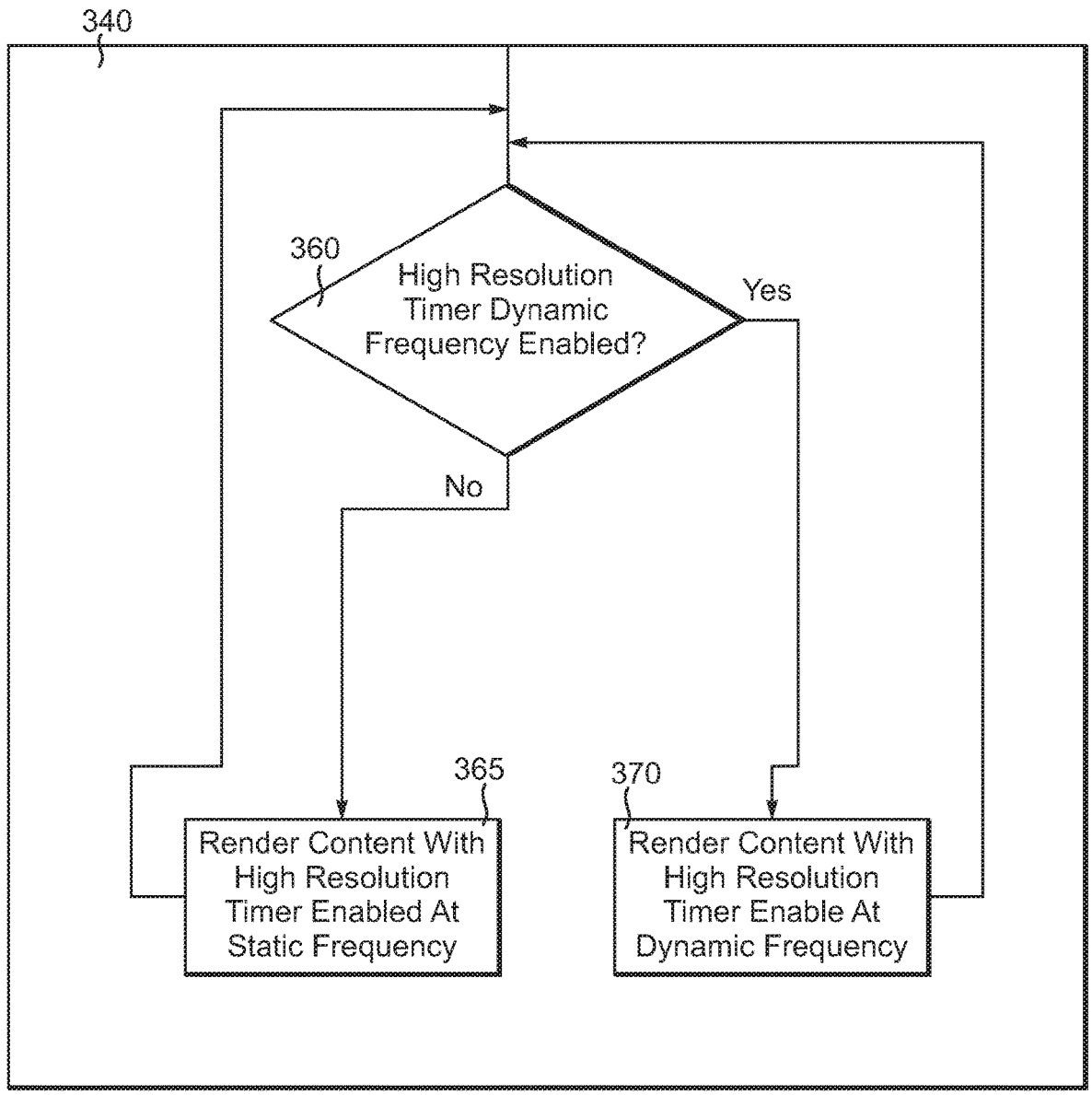
FIG. 12 is flow chart depicting exemplary rendering with or without dynamic timer frequency enabled.

Some additional exemplary details of step 340 in FIG. 11 may be understood by referring now also to FIG. 12, which is also flow chart. As noted above in the discussion of FIG. 8, the frequency of the high resolution timer 92 may be static or dynamic. Thus within step 340, if at step 360, high resolution timer dynamic frequency is not enabled, then at step 365, the content is rendered with the high resolution timer 92 at a static frequency followed by a loop back to step 360. The high resolution timer frequency may be set by user input or automatically if latency sensitive content is sensed. If, however, at step 360, high resolution timer dynamic frequency is enabled, then at step 370 the content is rendered with the high resolution timer 92 at a dynamic frequency based on the content followed by a loop back to step 360. The frequency may be adjusted up or down multiple times per second if desired based on the computationally intensive aspects of the content.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system, comprising:
a computing device operable to render video content for display on a display device and to periodically refresh that display device, the video content including at least one application window;
a desktop compositor operable to wake and execute commands to compose video frames that are composited surfaces that include the at least one application window and to initiate a buffer flip to deliver the video frames to the display device; and
a high resolution timer operable to cause the desktop compositor to wake in multiple instances between consecutive display refreshes to execute the commands if rendered video content is sensed.

2. The system of claim 1, wherein the display device can operate with a dynamic refresh rate.

3. The system of claim 1, wherein the computing device comprises an operating system, the desktop compositor being part of the operating system.

4. The system of claim 3, wherein the high resolution timer is part of the operating system.

5. The system of claim 1, comprising a video driver, the high resolution timer being part of the video driver.

6. The system of claim 1, wherein the display device operates with vertical synchronization (VSYNC) timing enabled, the high resolution timer being operable to cause the desktop compositor to wake and execute the commands independent of the VSYNC timing.

7. The system of claim 1, wherein the high resolution timer is operable to report to the desktop compositor prior to a next refresh that a buffer is available for rendering.

8. The system of claim 1, wherein the high resolution timer is configured to operate at dynamically adjustable frequencies based on the video content.

9. A method, comprising:
rendering video content for display on a display device and periodically refreshing that display device, the video content including at least one application window;

operating a desktop compositor to wake and execute commands to compose video frames that are composited surfaces that include the at least one application window and to initiate a buffer flip to deliver the video frames to the display device; and operate a high resolution timer to cause the desktop compositor to wake in multiple instances between consecutive display refreshes to execute the commands if rendered video content is sensed.

10. The method of claim 9, operating the display device with a dynamic refresh rate.

11. The method of claim 9, wherein the desktop compositor is part of an operating system.

12. The method of claim 11, wherein the high resolution timer is part of the operating system.

13. The method of claim 9, wherein the high resolution timer is part of a video driver.

14. The method of claim 9, operating the display device with vertical synchronization (VSYNC) timing enabled and operating the high resolution timer to cause the desktop compositor to wake and execute the commands independent of the VSYNC timing.

15. The method of claim 9, comprising operating the high resolution timer to report to the desktop compositor prior to a next refresh that a buffer is available for rendering.

16. The method of claim 9, comprising operating the high resolution timer at dynamically adjustable frequencies based on the video content.

17. In a system including a first computing system having a display device and being operable to render video content for display on the display device and to periodically refresh that display device, the video content including at least one application window, a method, comprising:

rendering the video content for display on a display device and periodically refreshing that display device;

operating a desktop compositor to wake and execute commands to compose video frames that are composited surfaces that include the at least one application window and to initiate a buffer flip to deliver the video frames to the display device; and operate a high resolution timer to cause the desktop compositor to wake in multiple instances between consecutive display refreshes to execute the commands if rendered video content is sensed.

18. The method of claim 17, operating the display device with a dynamic refresh rate.

19. The method of claim 17, wherein the desktop compositor is part of an operating system.

20. The method of claim 19, wherein the high resolution timer is part of the operating system.

21. The method of claim 17, wherein the high resolution timer is part of a video driver.

22. The method of claim 17, operating the display device with vertical synchronization (VSYNC) timing enabled and operating the high resolution timer to cause the desktop compositor to wake and execute the commands independent of the VSYNC timing.

23. The method of claim 17, comprising operating the high resolution timer to report to the desktop compositor prior to a next refresh that a buffer is available for rendering.

24. A non-transitory computer readable medium having computer readable instructions for performing a method, comprising:

rendering video content for display on a display device and periodically refreshing that display device, the video content including at least one application window;

operating a desktop compositor to wake and execute commands to compose video frames that are composited surfaces that include the at least one application window and to initiate a buffer flip to deliver the video frames to the display device; and operate a high resolution timer to cause the desktop compositor to wake in multiple instances between consecutive display refreshes to execute the commands if rendered video content is sensed.

* * * * *